(12) United States Patent
Al-Wazzan et al.

(10) Patent No.: US 10,183,882 B1
(45) Date of Patent: Jan. 22, 2019

(54) SYSTEM AND METHOD FOR PRETREATING TURBID SEAWATER

(71) Applicant: KUWAIT INSTITUTE OF SCIENTIFIC RESEARCH, Safat (KW)

(72) Inventors: Yousef Al-Wazzan, Al-Qirawan (KW);
Mansour Ahmed, Al-Jabriya (KW);
Abbas Al-Mesri, Safat (KW);
Mohamed Al-Tabtabaei, Safat (KW)

(73) Assignee: Kuwait Institute for Scientific Research, Safat (KW)

( * ) Notice: Subject to any disclaimer, the term of this patent is extended or adjusted under 35 U.S.C. 154(b) by 0 days.

(21) Appl. No.: 15/968,622

(22) Filed: May 1, 2018

(51) Int. Cl.
*B01D 21/00* (2006.01)
*C02F 9/00* (2006.01)
*B01D 21/26* (2006.01)
*B01D 21/01* (2006.01)
*B01D 61/14* (2006.01)
*C02F 1/00* (2006.01)
*C02F 1/52* (2006.01)
(Continued)

(52) U.S. Cl.
CPC ............... *C02F 9/00* (2013.01); *B01D 21/01* (2013.01); *B01D 21/262* (2013.01); *B01D 61/147* (2013.01); *B01D 2311/2649* (2013.01); *B01D 2311/2676* (2013.01); *C02F 1/004* (2013.01); *C02F 1/385* (2013.01); *C02F 1/444* (2013.01); *C02F 1/52* (2013.01); *C02F 2103/08* (2013.01); *C02F 2201/006* (2013.01)

(58) Field of Classification Search
None
See application file for complete search history.

(56) References Cited

U.S. PATENT DOCUMENTS 5,023,012 A * 6/1991 Buchan .................. C02F 1/52
210/725
5,221,480 A 6/1993 Schultheis et al.
(Continued)

OTHER PUBLICATIONS

Guyer, Introduction to Sludge Handling, Treatment and Disposal, Continuing Education and Development, Inc. (Year: 2011).*
(Continued)

*Primary Examiner* — Allison G Fitzsimmons
(74) *Attorney, Agent, or Firm* — Richard C. Litman

(57) ABSTRACT

The system and method for pretreating turbid seawater utilizes polyelectrolyte dosing, clarification through a clarifier system and centrifugation in a decanter centrifuge followed by microfiltration to treat seawater prior to its injection through a desalination plant. The system for pretreating turbid seawater includes a static mixer for mixing a polyelectrolyte with a stream of turbid seawater to produce a polyelectrolyte-treated seawater mixture. At least one clarifier tank is in fluid communication with the static mixer for receiving the polyelectrolyte-treated seawater mixture and removing a first portion of solids therefrom to produce a clarified seawater mixture. A decanter centrifuge is in fluid communication with the at least one clarifier tank for receiving the clarified seawater mixture and removing a second portion of solids therefrom to produce centrifuged seawater. A microfiltration system is in fluid communication with the decanter centrifuge for receiving the centrifuged seawater to produce the pretreated seawater.

7 Claims, 4 Drawing Sheets

(51) Int. Cl.
*C02F 1/44* (2006.01)
*C02F 103/08* (2006.01)
*C02F 1/38* (2006.01)

(56) References Cited

U.S. PATENT DOCUMENTS

| | | | |
|---|---|---|---|
| 5,482,634 A | | 1/1996 | Goerlach-Doht et al. |
| 5,647,986 A | * | 7/1997 | Nawathe ................. C02F 3/006 210/195.3 |
| 7,018,539 B2 | | 3/2006 | Mairal et al. |
| 2003/0192827 A1 | * | 10/2003 | McDowell ............. B01D 21/04 210/623 |
| 2005/0103719 A1 | * | 5/2005 | Binot ........................ C02F 1/52 210/723 |
| 2013/0081997 A1 | | 4/2013 | Kashihara et al. |
| 2015/0375174 A1 | * | 12/2015 | Agnihotri ............... C02F 1/441 210/141 |
| 2016/0158672 A1 | | 6/2016 | Matsui |

OTHER PUBLICATIONS

Al-Wazzan, Y., et al. "Decanter system as mechanical treatment for enhancing seawater feed quality at Sabiya power generation and water desalination plant." Desalination and Water Treatment 80 (2017): 53-60.

* cited by examiner

SYSTEM AND METHOD FOR PRETREATING TURBID SEAWATER

BACKGROUND

1. Field

The disclosure of the present patent application relates to water treatment, and particularly to a system and method for pre-treating turbid seawater which combines polyelectrolyte dosing, clarification through a clarifier system and centrifugation in a decanter centrifuge followed by microfiltration in order to reduce the turbidity of the seawater to provide a suitable feed for a desalination plant, e.g., for reverse osmosis or multi-stage flash desalination.

2. Description of the Related Art

In numerous parts of the world, large scale desalination plants are used to provide most, if not all, of the potable water available to the region. Many desalination plants are also coupled with hydroelectric power systems, thus further providing power to the region. In such plants, the feed is typically seawater injected directly from a sea or an ocean. This "raw" seawater feed, however, is often turbid; i.e., so mixed with sand and silt as to be opaque. The concentrations of solids in such turbid water make it impossible to use this raw seawater feed directly in common desalination processes, such as multistage flash (MSF) and reverse osmosis (RO). Excess turbidity, as measured by the silt density index (SDI, which indicates the fouling propensity of the seawater) or by nephelemetric unit (NTU, an indication of the amount of turbidity in seawater), causes problems for thermal desalination equipment and power generation turbines, such as biofouling, scaling, etc., that may cover heat exchangers with silt, precipitate silt in the seawater intake, form scale in distillation chambers and pipes, and the like. Such damage may result in significant down time and expensive maintenance, jeopardizing the commercial viability of a desalination plant.

Although hydrocylonic systems are often used for pretreatment of the seawater, highly turbid water may only be improved by about 16%, thus making this technique ineffective where turbidity is severe. For multi-stage flash desalination, an NTU<50 is desirable, while for reverse osmosis, an NTU<1 and SDI<3 are desirable for optimal performance. Such numbers are difficult to achieve by mechanical means alone or by microfiltration alone. Thus, a system and method for pretreating turbid seawater solving the aforementioned problems is desired.

SUMMARY

The system and method for treating turbid seawater utilizes polyelectrolyte dosing, clarification through a clarifier system and centrifugation in a decanter centrifuge followed by microfiltration to treat seawater prior to its feeding the seawater through a desalination plant or the like, such as, for example, a reverse osmosis (RO) desalination plant. The system and method for treating turbid seawater allows an RO desalination plant, for example, to operate at stable fluxes with high recovery rates. It should be understood that the system and method for treating turbid seawater may be applied to the feeds of other types of desalination technologies, such as, for example, multi-stage flash (MSF) desalination. The system and method for treating turbid seawater allows for operation in such desalination plants with less capital investment, less chemical usage, and with reduced energy requirements.

The system for treating turbid seawater includes a static mixer for mixing a polyelectrolyte with a stream of turbid seawater. At least one clarifier tank is in fluid communication with the static mixer for receiving the mixture and removing a first portion of solids therefrom to produce a clarified seawater mixture. The clarifier system may include a plurality of clarifier tanks in series, with the polyelectrolyte-treated seawater mixture passing sequentially therethrough.

A strainer may be in fluid communication with the at least one clarifier tank for straining the clarified seawater mixture prior to its reception in a feed tank. The feed tank stores the clarified seawater mixture prior to injection thereof into a decanter centrifuge. An agitator may be disposed in the feed tank to prevent solid precipitation in the clarified seawater mixture prior to its injection into the decanter centrifuge.

The decanter centrifuge is in fluid communication with the feed tank for receiving the clarified seawater mixture and removing a second portion of solids therefrom to produce centrifuged seawater. The centrifuged seawater is stored in a refined seawater tank prior to its injection through a microfiltration (MF) system to produce the pretreated seawater. In the particular case in which the pretreated seawater is used as a feed for thermal desalination technologies, the centrifuged seawater may be further passed through a cartridge filter prior to being received in the refined seawater tank. For all types of desalination technologies, including reverse osmosis, the pretreated seawater product (after passing through the MF system) may be stored in a treated seawater tank for feed into a desalination plant or the like.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
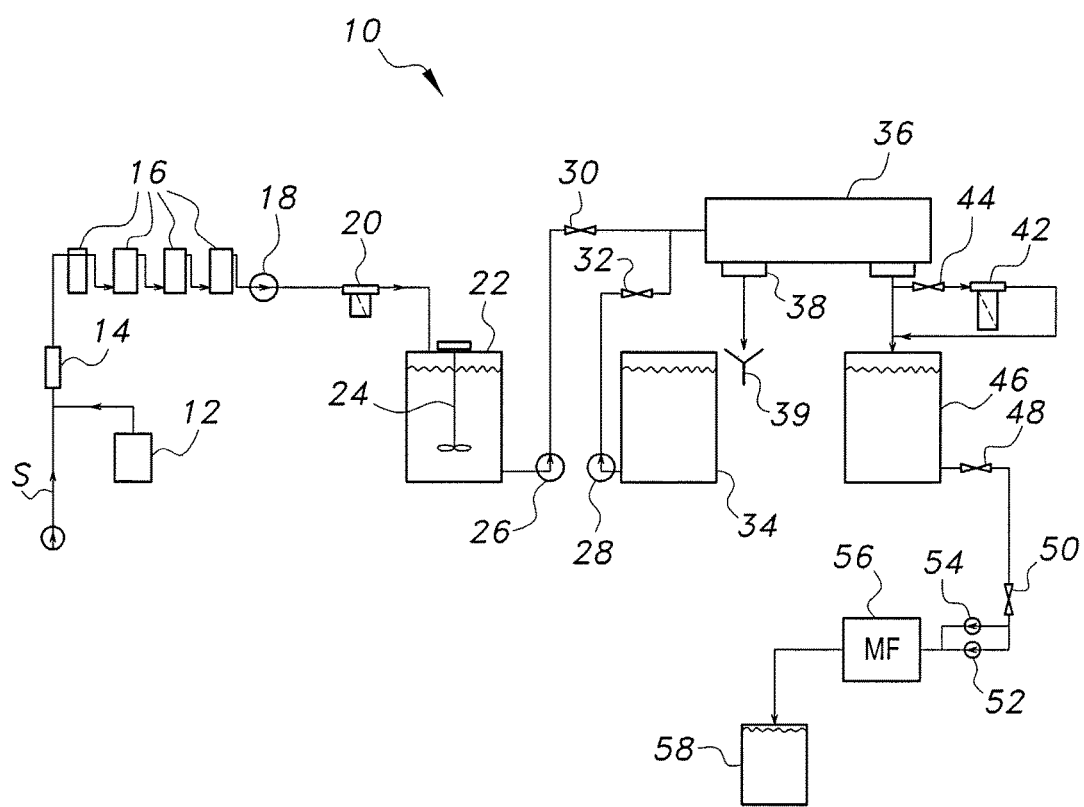
FIG. 1 is a schematic diagram of a system for pretreating turbid seawater.

The system and method for pretreating turbid seawater utilizes a combination polyelectrolyte dosing, clarification through a clarifier system, centrifugation in a decanter centrifuge, and microfiltration to pretreat seawater prior to its injection through a desalination plant or the like. As shown in FIG. 1, the system for pretreating turbid seawater 10 includes a polyelectrolyte dosing system 12 for dosing turbid seawater S with a polyelectrolyte pre-treatment. Polyelectrolyte pretreatment to coagulate/flocculate suspended matter is well known in the art for reverse osmosis membrane systems. A static mixer 14 is provided for mixing the polyelectrolyte with the stream of turbid seawater S to produce a polyelectrolyte-treated seawater mixture. It should be understood that any suitable type of mixer, such as static mixer 14, may be used to produce the pre-treated seawater mixture. The polyelectrolyte dosing system 12 may include a conventional tank, dosing pump, agitator and emergency level indicator.

At least one clarifier tank 16 is in fluid communication with static mixer 14 for receiving the pre-treated seawater mixture and removing a first portion of solids therefrom to produce a clarified seawater mixture. As illustrated, the clarifier system may include a plurality of clarifier tanks 16 in series, with the polyelectrolyte-treated seawater mixture passing sequentially therethrough. Although a series of four such clarifier tanks 16 are shown in FIG. 1, it should be understood that any suitable number of clarifier tanks 16 may be used.

Figure 2:
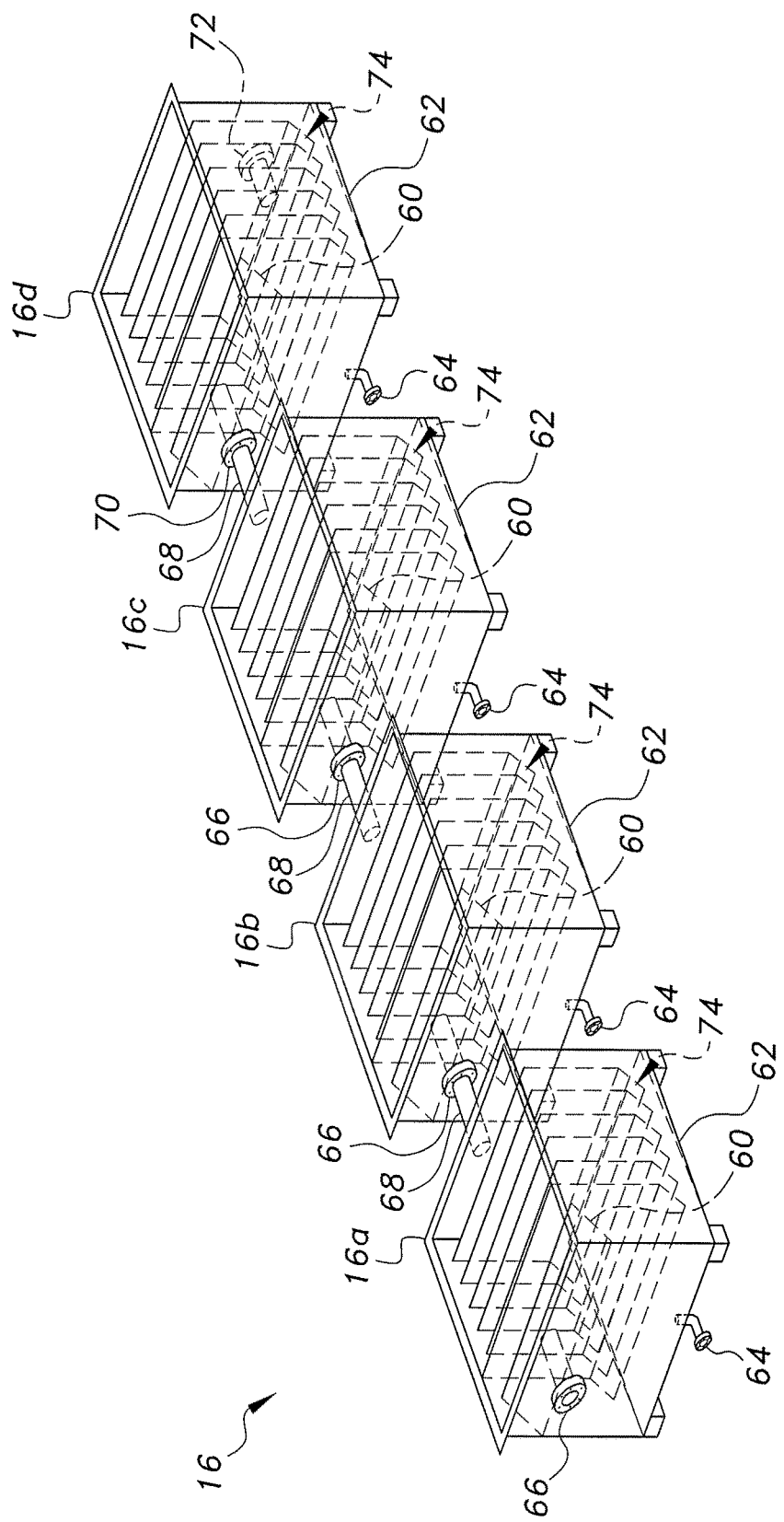
FIG. 2 is a schematic diagram of a clarifier system of the system for pretreating turbid seawater.

In order to test the system and method for treating turbid seawater, a polyelectrolyte-treated seawater mixture was passed through four such clarifier tanks, each with a 1 cubic meter capacity. The clarifier tanks were designed to stabilize the quality of the pre-treated seawater mixture feed and to increase the contact time for the coagulation/flocculation process. Each clarifier tank was fabricated using natural color polypropylene. Polypropylene was chosen due to its resistance to chemicals and its hydrophobic nature. Each clarifier tank was substantially cubicle, with dimensions of 1 m×1 m×1 m, with the walls and bottom of each tank each having a thickness of 8 mm. FIG. 2 illustrates the four tanks 16a, 16b, 16c and 16d connected in series. The clarifier tanks 16a-16d were conventional cubical clarifier tanks with fixed inner separators, each having a thickness of 8 mm, fixed flaps 74, each having a thickness of 6 mm, and covers, each having a thickness of 6 mm.

Each clarifier tank had a sloped bottom 62, a 50 mm height differential between the lowest point and the highest point, and a 45° angle at the inner, lower portion of the vertical flaps. A flow absorbent sheet 60 was placed 100 mm from the top edge of each tank, and the bottom layers of the tanks had, at their lowest points, 2-inch drainage connections 64, terminating with a flange for further connection. The first three tanks in the series (16a, 16b, 16c) each contained 4-inch inlet and outlet connections 66, 68, respectively, terminating with a flange for further connections. The inlet and outlet connections were positioned 100 mm from the top of each tank. The fourth and final tank 16d in the series contained 4-inch inlet and outlet connections 70, 72, respectively, each terminating with a flange for further connection. The inlet connection 70 was positioned 100 mm from the top of the tank 16d, and the outlet connection was positioned 10 mm from the bottom of the tank. The inlet connection 70 of the fourth tank 16d may be used as an overflow.

A strainer 20 may be in fluid communication with the at least one clarifier tank 16 for straining the clarified seawater mixture prior to its reception in a feed tank 22. As shown, a conventional pump 18 or the like may be provided for controlled injection of the clarified seawater mixture through strainer 20 and into feed tank 22. The feed tank 22 stores the clarified seawater mixture prior to injection thereof into a decanter centrifuge 36 under the power of centrifugal pump 26 or the like. As shown, an agitator 24 may be disposed in the feed tank 22 to prevent solid precipitation (i.e., precipitation of silt and/or sand) in the clarified seawater mixture prior to its injection into the decanter centrifuge 36. It should be understood that any suitable type of agitator, or source of agitation, may be installed within feed tank 22.

The decanter centrifuge 36 is in fluid communication with the feed tank 22 for receiving the clarified seawater mixture and removing a second portion of solids therefrom to produce refined seawater. The decanter centrifuge 36 receives flushing water from a flushing tank 34, under the power of conventional pump 28 or the like. The flow of the clarified seawater mixture fed into the decanter centrifuge 36 may be selectively controlled by a valve 30. Similarly, the control and flow of the flushing water from the flushing tank 34 may be selectively controlled by a valve 32. The decanter centrifuge 36 separates the remaining solids from the clarified seawater mixture. The solids are discharged through a solid outlet port 38 for capture by a receiver 39. The refined seawater exits through refined seawater port 40 for storage in a refined seawater tank 46.

Figure 3B:
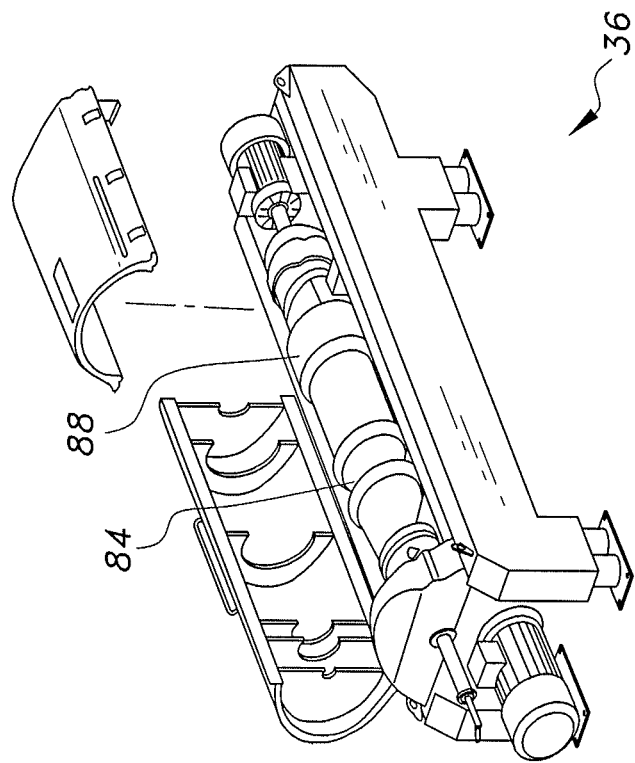
FIG. 3B is a partially exploded perspective view of the decanter centrifuge of FIG. 3A.
Figure 3A:
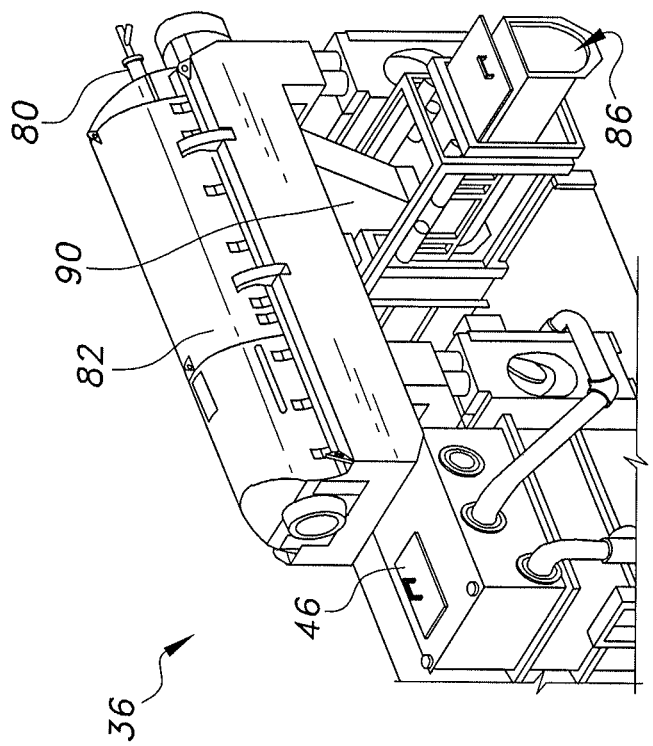
FIG. 3A is a perspective view of a decanter centrifuge of the system for pretreating turbid seawater.

In order to test the system and method for treating turbid seawater, a centrifugal pump 26 was used to pump the clarified seawater feed to the decanter centrifuge 36 through a centrally arranged inlet tube 80. A decanter centrifuge was used in the test, as shown in FIGS. 3A and 3B, in which the clarified seawater was distributed through several tube openings in the interior region of a decanter bowl, as is well known in the art of centrifugation. The centrifugal force that developed while the decanter bowl was rotating was used to fling the solids onto internal walls of the bowl, where they formed a sediment layer. The solids were delivered through a screw conveyer to a solids compartment. The solids were then transported through outlet openings in a rotation unit 82 and into a solids chamber 84 in the housing of the decanter centrifuge 36. The solids then moved through a drain funnel 90 and into a spiral conveyer 86, exiting the decanter centrifuge through port 38 and into receiver 39.

The refined seawater then flowed into the rear section of the rotation unit 82, where it passed four overflow circular slots to liquid chamber 88. The rotation unit 82 was cylindrical, with a conical end. The cylindrical part included the drain for the refined seawater (i.e., the liquid compartment). The conical end included ejection openings for discharging the solids and concentrated turbid seawater into the solid chamber 84 of the housing (i.e., the solid compartment). Automatic flushing was performed using permeate (stored in flushing tank 34) at each plant shutdown. By flushing the remaining seawater, along with the removal of accumulated silt and sand inside the unit, scaling and corrosion due to stagnation were minimized, and solidification of fine silt and sand was prevented.

In the particular case in which the pretreated seawater is used as a feed for thermal desalination technologies, the refined seawater may be passed through a cartridge filter 42 prior to being received the centrifuged seawater tank 46. In testing, a 5-micron cartridge filter was used. Selection of this additional filtration path is made via valve 44. The refined seawater may be released from centrifuged seawater tank 46 under the control of valves 48, 50 for passage through a microfiltration system 56 to produce the final pretreated seawater product. The centrifuged seawater is injected through the microfiltration (MF) system 56 by conventional pumps 52, 54 or the like. For all types of desalination technologies, including reverse osmosis, the pretreated seawater product (after passing through the MF system) may then be stored in a pretreated seawater tank 58 for use in a desalination plant or the like.

The testing described above was performed using a decanter centrifuge with circular slots (25% closed), a bowl rotation speed of 2,500 rpm, a speed difference between the bowl and the screw of 35 rpm, and a seawater feed flow of about 3.5 m³/h. The performance in this test was monitored for about 11 days of continuous operation. Each day of operation, data was recorded every hour, starting at 7 AM and ending at 5 PM. Each hour, turbidity readings were measured twice for water samples taken from seawater intake S, seawater following clarification in tanks 16-16d, and the centrifuged seawater output by decanter centrifuge 36, both without passage through the 5-micron cartridge filter 42 and with passage through 5-micron cartridge filter 42. During a total actual testing time of 264 hours of operation, the decanter centrifuge was stopped a few times to grease the decanter bowl and the screw motor bearings. The total stoppage time did not exceed 1 hour of the total time of operation. Because of this, the actual testing period was longer than the actual running time, giving the decanter centrifuge 99.6% availability. In general, the decanter centrifuge must be shut down to grease the screw, bowl and gear box for periods of 15, 30 and 60 minutes each for 100, 200 and 2,500 running hours of operation, respectively.

In the test, the polyelectrolyte was injected in-line at a dosing rate of 2 parts per million (ppm). The polyelectrolyte usually comes in a powdered form and, after a few laboratory tests using turbid seawater samples, it was found that the best mixing rate was to add 2 g of polyelectrolyte to every 1 L of fresh water. As described above, further tests included using the centrifuged seawater as a feed for the microfiltration system 56. The MF treated seawater was further tested to obtain silt density index (SDI) measurement values, thus testing whether the treated seawater will be suitable to be used as a feed to reverse osmosis (RO) technology.

Figure 4:
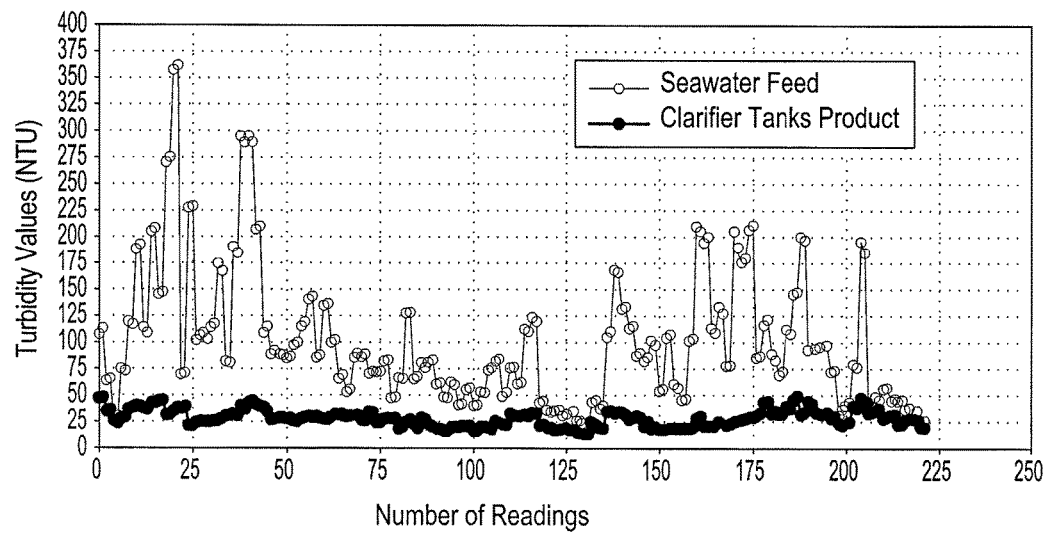
FIG. 4 is graph comparing turbidity values of an untreated seawater feed against those following treatment with the clarifier system of FIG. 2.

FIG. 4 shows the performance of the four clarifier tanks, which were installed ahead of the decanter unit to stabilize the quality of the feed and to increase the contact time for the coagulation/flocculation process. Polyelectrolyte was injected at a rate of 2 ppm on the feed line, as shown in FIG. 1. The seawater feed flow to the tanks was set to 3.5 m3/h. The data presented in FIG. 4 covered about 220 turbidity readings, in order to show how effective the clarifier tanks were in stabilizing the quality of the seawater feed at SPDP (the Sabiya power generation and water desalination plant, the largest power and water production station in Kuwait).

FIG. 4 shows the turbidities of the feed and clarifier tanks product in nephelemetric turbidity units (NTU) vs. the number of readings. During the monitoring period, the turbidity of the feed fluctuated between minimum and maximum values of 25.5 NTU and 361 NTU, respectively. The turbidity values of the clarifier tanks product followed a similar trend as that of the turbidity values of the feed; i.e., as the feed turbidity values increase, so does the turbidities of the product and vice versa. However, all of the clarifier tanks product turbidity values were below 50 NTU. Thus, the polyelectrolyte at the dosing rate used in the test was effective. This can be seen at reading numbers of 1, 8, 11, 21, 40, 163, 188 and 205, where the seawater turbidity feed values were 113, 119, 192, 361, 295, 200, 200, 185 NTU and the product turbidity values were 47.5, 37.4, 38.3, 42.5, 20.4, 31.3 and 43.9 NTU, respectively.

At lower feed turbidity values, such as at reading numbers of 2, 5, 22, 59, 130 and 220, the feed turbidities were 63.6, 30, 70, 88, 23 and 25.1 NTU and the product turbidity values were 35.3, 24.2, 38.3, 28.5, 12.9 and 19.9, respectively. FIG. 4 also shows that at higher turbidity feed values, a higher reduction of silt and/or sand was calculated. For example, at reading numbers of 21, 40, 163, 188 and 205, the reduction of silt and/or sand were calculated to be 89.4, 85.6, 89.9, 84.35 and 76.2%, respectively. However, at low feed turbidity values, a lower reduction of silt and/or sand was calculated. For example, at readings 2, 5, 22, 59, 130 and 220, the reduction of silt and/or sand were calculated to be 44.5, 19.3, 45.3, 67.6, 44 and 20.7%, respectively. Thus, the clarifier tanks with polyelectrolyte dosing work more efficiently when the turbidity of the feed exceeds 100 NTU.

Figure 5:
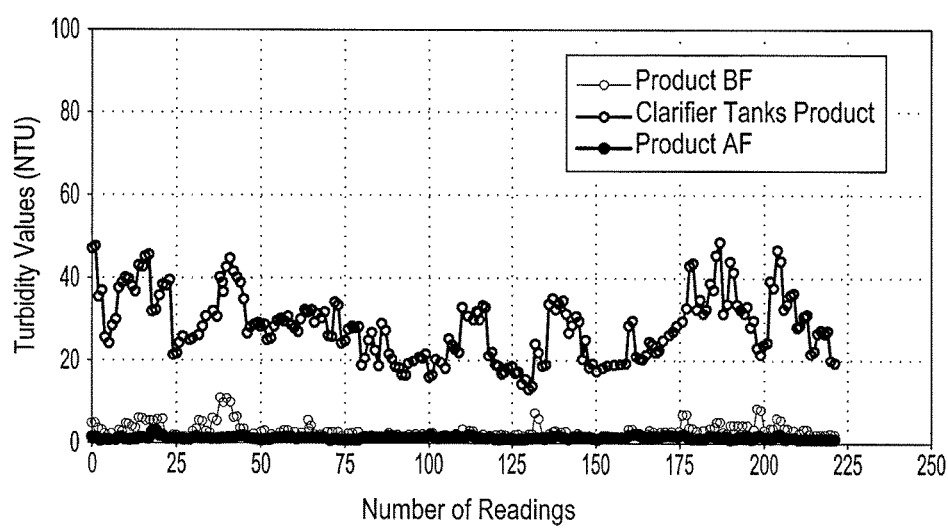
FIG. 5 is a graph comparing turbidity values of seawater treated with the clarifier system of FIG. 2 with the decanter centrifuge product, before and after microfiltration.

FIG. 5 shows the performance of the decanter centrifuge unit, using the water produced by the clarifier tanks as a feed. FIG. 5 further shows the turbidity values of the clarifier tanks and decanter centrifuge product before (BF) and after (AF) passing through the 5 micron filter (in NTU). The turbidity values of the feed shown in FIG. 5 fluctuated between minimum and maximum values of 12.9 and 48.5 NTU, respectively. The turbidity values produced before and after passing through the cartridge filter fluctuated between minimum and maximum values of 1.21 and 10.7 and 0.5 and 2.76, respectively. The decanter centrifuge was able to reduce silt and/or sand from the feed at peak points at reading numbers of 1, 3, 10, 41, 190 and 213 by 90, 91.5, 88.6, 78.4, 90.5 and 89.7, respectively. However, at lower peaks, the decanter centrifuge was able to reduce silt and/or sand at reading numbers 5, 24, 100, 130, 199 and 220 by 92, 91, 86, 84, 64.7 and 89.7%, respectively. This shows that the decanter centrifuge, in general, is capable of reducing silt and sand in the range of 80% and higher. The lower reduction rates were due to start of operation and dosing after each stop for greasing purposes. With regard to the turbidity values produced after the cartridge filter (AF), most cases resulted in turbidity values below 1 NTU, except for three particular cases, where the turbidity values recorded at reading numbers 18, 19 and 176 were 2.72, 2.76 and 2.08, respectively. This may be due to the size of silt particles passing through the filter at those specific times.

Several SDI tests were conducted using the filtered treated seawater with turbidity values of less than 2 NTU. However, the best SDI reading value obtained was 6. Furthermore, six SDI tests were carried out in two batches using the seawater produced by the decanter centrifuge as feed to the MF system. Table 1 below shows that the seawater turbidity values obtained using the MF system were between 0.25 NTU and 0.17 NTU. The quality of the treated seawater obtained using MF as a final treatment was successful in obtaining SDI values of less than 3.5, as indicated in Table 1. The results obtained using the MF system as a final treatment was found to be promising, and its quality is suitable for safe usage as feed for membrane and thermal desalination units, as well as for power generation equipment.

TABLE 1

Turbidity and SDI Measurement Values Obtained Using MF

| | SDI Tests | | | | | |
|---|---|---|---|---|---|---|
| No. | 1 | 2 | 3 | 4 | 5 | 6 |
| Turbidity (NTU) | 0.25 | 0.20 | 0.20 | 0.18 | 0.17 | 0.17 |
| SDI | 3.45 | 3.35 | 3.34 | 3.33 | 3.325 | 3.23 |

It is to be understood that the system and method for treating turbid seawater is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for pretreating turbid seawater, comprising:
a mixer for mixing a polyelectrolyte with a stream of turbid seawater to produce a polyelectrolyte-treated seawater mixture;
a plurality of clarifier tanks arranged in series and being in fluid communication with the mixer for receiving the polyelectrolyte-treated seawater mixture being passed sequentially therethrough and removing a first portion of solids therefrom to produce a clarified seawater mixture;
a strainer in fluid communication with the plurality of clarifier tanks for straining the clarified seawater mixture;
a decanter centrifuge in fluid communication with the plurality of clarifier tanks for receiving the clarified seawater mixture and removing a second portion of solids therefrom to produce centrifuged seawater;
a microfiltration system in fluid communication with the decanter centrifuge for receiving the centrifuged seawater to produce pretreated seawater; and
a cartridge filter in fluid communication with the decanter centrifuge and the microfiltration system for filtering the centrifuged seawater.

2. The system for pretreating turbid seawater as recited in claim 1, wherein the mixer comprises a static mixer.

3. The system for pretreating turbid seawater as recited in claim 1, further comprising a feed tank in fluid communication with the strainer and the decanter centrifuge for storing the clarified seawater mixture prior to the injection thereof into the decanter centrifuge.

4. The system for pretreating turbid seawater as recited in claim 3, further comprising an agitator disposed in the feed tank to prevent precipitation in the clarified seawater mixture prior to the injection thereof into the decanter centrifuge.

5. The system for pretreating turbid seawater as recited in claim 1, further comprising a cartridge filter in fluid communication with the decanter centrifuge and the microfiltration system for filtering the centrifuged seawater.

6. The system for pretreating turbid seawater as recited in claim 1, further comprising a refined seawater tank in fluid communication with the decanter centrifuge and the microfiltration system for storing the centrifuged seawater prior to injection through the microfiltration system.

7. The system for pretreating turbid seawater as recited in claim 1, further comprising a treated seawater tank in fluid communication with the microfiltration system for storing the pretreated seawater.

* * * * *